United States Patent
Hosaka et al.

(10) Patent No.: US 6,307,975 B1
(45) Date of Patent: *Oct. 23, 2001

(54) IMAGE CODING TECHNIQUE EMPLOYING SHAPE AND TEXTURE CODING

(75) Inventors: Kazuhisa Hosaka, Saitama; Yoichi Yagasaki, Kanagawa, both of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/964,187

(22) Filed: Nov. 4, 1997

(30) Foreign Application Priority Data

Nov. 5, 1996 (JP) .................................................. 8-292430

(51) Int. Cl.[7] ................................ G06K 9/36; G06K 9/46
(52) U.S. Cl. ...................................... 382/243; 375/240.28
(58) Field of Search ..................................... 382/233, 242, 382/243, 282, 283, 284; 358/431, 433, 450, 453, 467, 538; 348/397, 420, 584, 585, 586, 598, 397.1, 420.1; 345/430, 433, 434, 435, 113, 114, 118, 582, 619–620, 629; 375/240.28

(56) References Cited

U.S. PATENT DOCUMENTS 5,459,513 * 10/1995 Oddou ................................. 348/397
5,574,504 * 11/1996 Yagasaki et al. .................... 348/415
5,703,966 * 12/1997 Astle ................................... 382/236
5,808,682 * 9/1998 Okunoki et al. ..................... 348/391

OTHER PUBLICATIONS

Sikora et al., Shape–Adaptive DCT for Generic Coding of Video, Feb. 1995, pp. 59–62, IEEE.*

* cited by examiner

Primary Examiner—Timothy M. Johnson
(74) Attorney, Agent, or Firm—Frommer Lawrence & Haug LLP; William S. Frommer; Glenn F. Savit (57) ABSTRACT

An image coding apparatus and method code an object image by separating the object image into a shape representing the outline of the object image and a texture representing the pixel values of the object image. The coded object image is decoded by an image decoding apparatus and method adapted for the image coding apparatus and method. The image decoding apparatus and method generate a shape code by coding the shape in predetermined units, generate a texture code by coding the texture in predetermined units, and generate a synchronization code with respect to the shape code for each predetermined unit and the texture code for each predetermined unit. The generated synchronization code is added to the shape code for each predetermined unit and the texture code for each predetermined unit, which thus provides codes enabling restoration from an erroneous condition.

9 Claims, 11 Drawing Sheets

FIG. 2

| SYNCHRO-NIZATION CODE | SHAPE CODE (ONE SLICE) | TEXTURE CODE (ONE SLICE) |

TEXTURE

SHAPE (KEY IMAGE)

BACKGROUND IMAGE

COMPOSITE IMAGE

IMAGE CODING TECHNIQUE EMPLOYING SHAPE AND TEXTURE CODING

BACKGROUND OF THE INVENTION

1. Field of the Invention

The present invention relates to image coding apparatuses and methods, image decoding apparatuses and methods, image transmission methods and image recording media, and in particular, to an image coding apparatus and method, an image decoding apparatus and method, an image transmission method, and an image recording medium, adapted for transmission of image signals by using transmitters having various transmission rates, such as an analog or digital telephone line and a leased data transmission line, and for the recording of the image signals to storage media having various storage capacities, such as an optical disc, a magnetic disc and a random access memory.

2. Description of the Related Art

Figure 9:
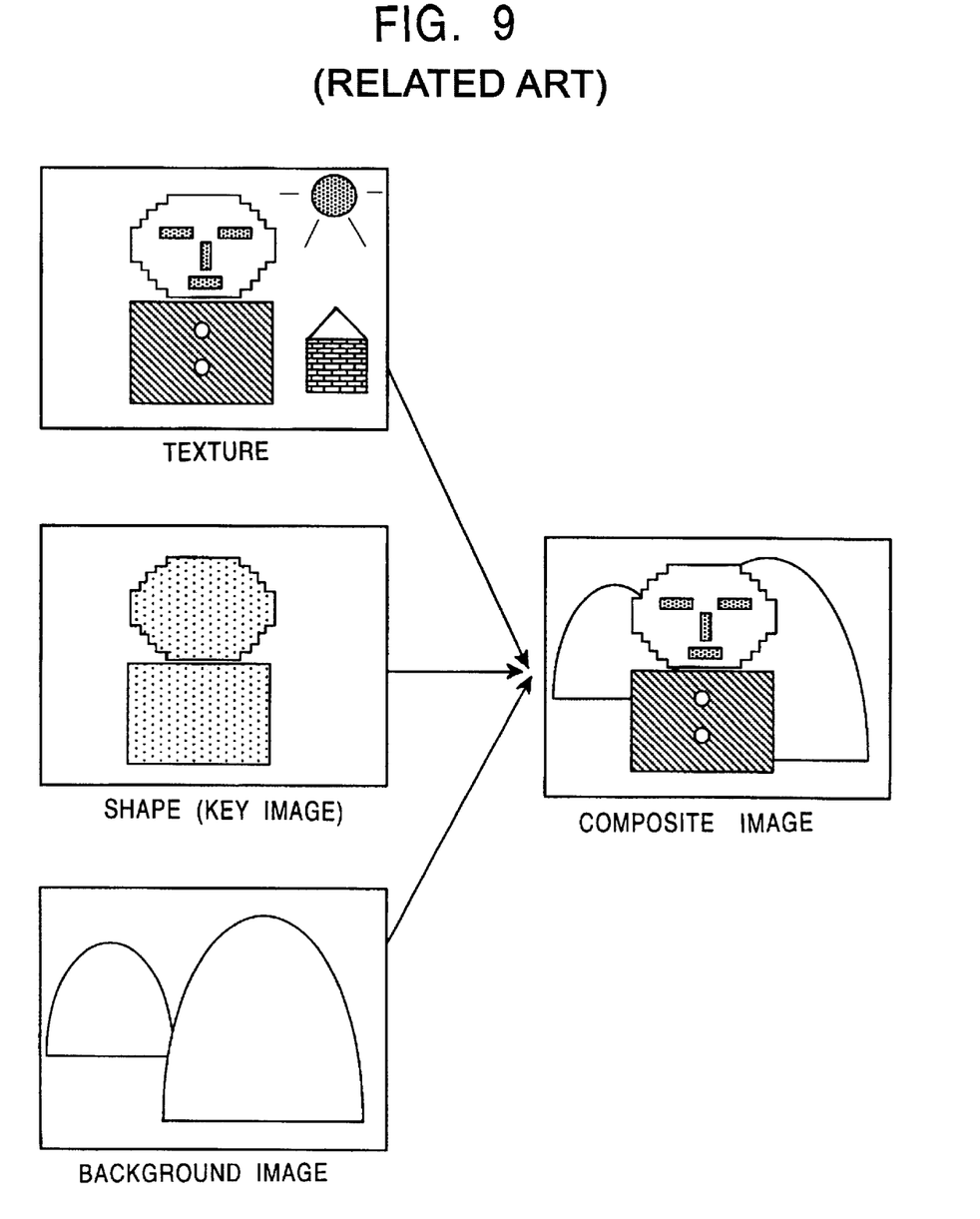
FIG. 9 is a chart illustrating a shape and a texture.

One of methods for coding an image is an image coding method hating the function of object scalability. As shown in FIG. 9, when an image is coded with the object scalability, an object in the image is cut out separately from the remaining background before it is coded. An area of the object to be cut out is indicated by a "shape", and information on the brightness and color difference of the object cut out is indicated by a "texture". In this method a coding apparatus codes the background image, and the texture and shape for each object. A decoding apparatus decodes the coded background image and the texture and shape coded for each object, and combines the decoded texture with the background image, based on the location indicated by the shape. The shape information is also called the "key image", which is expressed as a binary or multivalued image. The texture cut out is also called the "fill image."

Using the object scalability enables control of each object and adjustment of the image quality of each object. By operating each object, only an interesting object can be down-loaded, and an arbitrary object can be combined with another image. In adjusting the image quality of each object, the image can be coded such that the image is separated into an important body and a background, and the important body is finely quantized, while the background is roughly quantized. At this time, by using the amount of code reduction caused by the rough quantization of the background in order to quantize the important object finely, the identical amount of total codes generated can improve the subjective image quality.

In order to use the above-mentioned advantages, the coding of the shape information itself is important. Similar to other coding methods, the shape-information coding method has the following preferable characteristics: a small amount of codes generated, strong durability against errors in a storage medium or transmission line, and small delay caused by coding or decoding.

Figure 10:
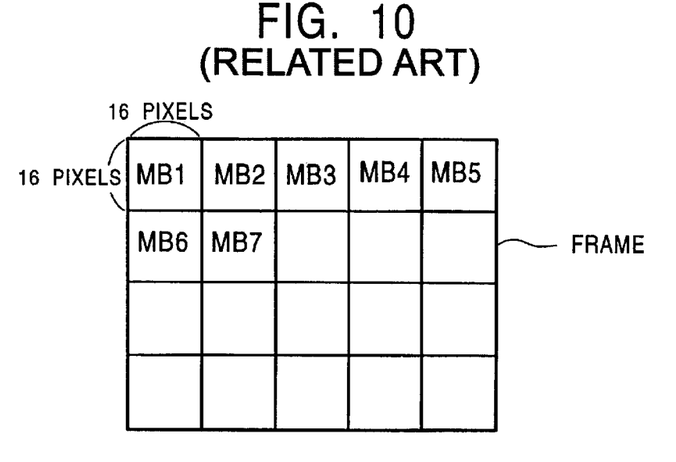
FIG. 10 is a chart illustrating macroblocks.
Figure 11:
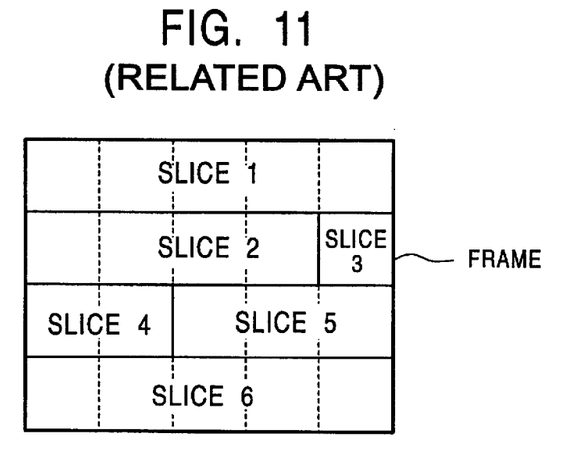
FIG. 11 is a chart illustrating slices.
Figure 12:
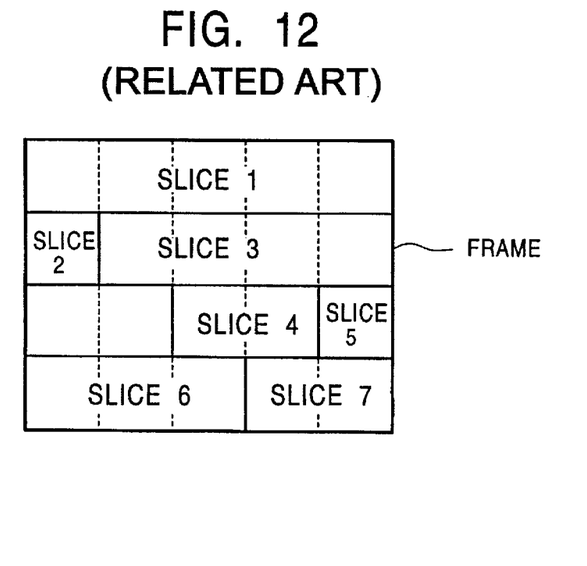
FIG. 12 is a chart illustrating slices.

In image coding, one frame (one image) is divided into blocks of 16×16 pixels as shown in FIG. 10 in consideration of, in general, ease of motion compensation and affinity with the discrete cosine transform (DCT). One block is the unit of processing. One block of 16×16 pixels is called a "macroblock". An image (frame) to be coded is divided into macroblocks, and the macroblocks are processed from the top row to the bottom row, and in a row they are processed from left to right. A set of an arbitrary number of macroblocks combined in the order given is called a "slice". As shown in FIG. 11, normally, slices are defined so that each slice does not occupy two or more rows. However, as shown in FIG. 12, in general, the slices can be arbitrarily defined.

Figure 13:
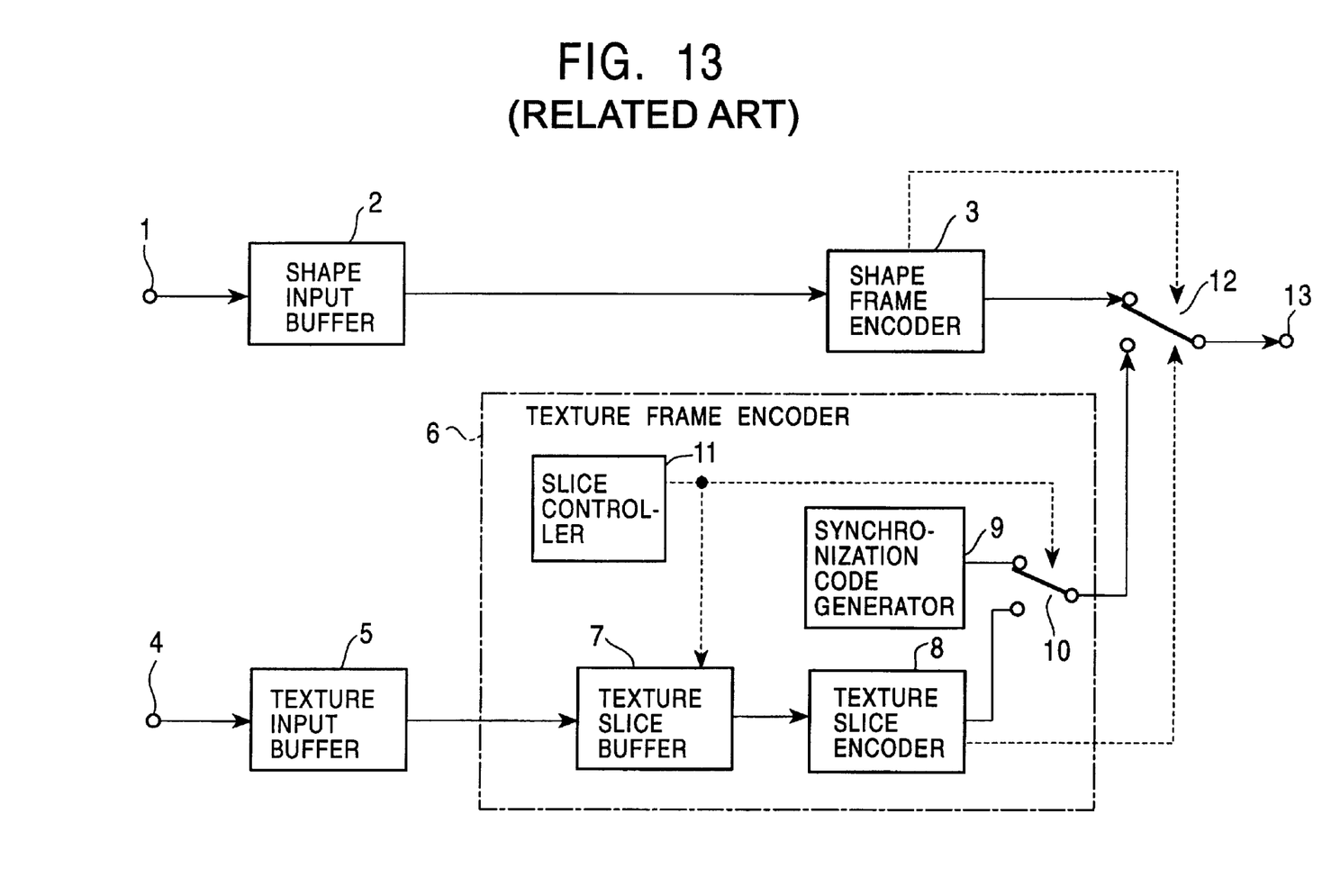
FIG. 13 is a block diagram showing an image coding apparatus.

FIG. 13 shows a coding apparatus using the object scalability.

A flow of processing by the coding apparatus shown in FIG. 13 is as follows (here, for simplified explanation, the coding of a shape and a texture with respect to one object will be described):

A shape input from a shape input terminal 1 is stored in a shape input buffer 2. A shape frame encoder 3 codes the shape stored in the shape input buffer 2 frame by frame, and sends the coded shape to a switch 12.

Coding methods which can be employed by the shape frame encoder 3 include the following four methods: one based on the modified modified relative element address designate (MMR) coding as a facsimile coding method; one based on the joint bi-level image expert group (JBIG) (whose details are described than Television Society of Japan, vol. 48, No. 1, pp. 65–68 (1994)); one based on the chain coding of the boundary between the interior and exterior of a body by using its starting point and successive direction; and one based on the quad-tree in which a case with all the leaves being identical is omitted.

A texture input from a texture input terminal 4 is stored in a texture input buffer 5. A texture frame encoder 6 codes the texture stored in the texture input buffer 5 frame by frame, and sends the coded texture to the switch 12.

Coding by the texture frame encoder 6 is performed by devices shown in the dotted-line frame in FIG. 12. Since the texture is input to the texture input terminal 4 in the order of raster scanning, in a texture slice buffer 7 each texture is divided into slices composed of a plurality of macroblocks, and the macroblocks are stored. At this time, a signal for defining the slices is sent from a slice controller 11 to the texture slice buffer 7. A texture slice encoder 8 codes the texture supplied from the texture slice buffer 7, and sends the generated codes to a switch 10. In the texture slice encoder 8 the coding is performed normally in units of macroblocks. In the coding there is employed a coding method including the motion compensation and the DCT so that the intra-coding which performs coding within one texture, and the inter-coding which performs coding with chronologically input textures are selected. In the coding of motion in order to be used in the motion compensation in the inter-coding, and the coding of dc components in the DCT, the interrelation of the macroblocks is also used. The interrelation of the macroblocks is not used in the coding of macroblocks having different slices. Thus, the coding is closed in each slice.

The switch 10 alternately selects a synchronization code generated by a synchronization code generator 9 or a texture code for one slice generated by the texture slice encoder 8, and outputs it. At this time the switch 10 is controlled based on the signal for defining slices sent from the slice controller 11.

The switch 12 alternately selects the shape code for one frame generated by the shape frame encoder 3 or the texture codes for one frame output from the switch 10, and outputs it to a code output terminal 13. The switch 12 is controlled such that a signal representing the termination of coding for one frame is sent from the shape frame encoder 3 or the texture slice encoder 8 to the switch 12.

Figure 14:
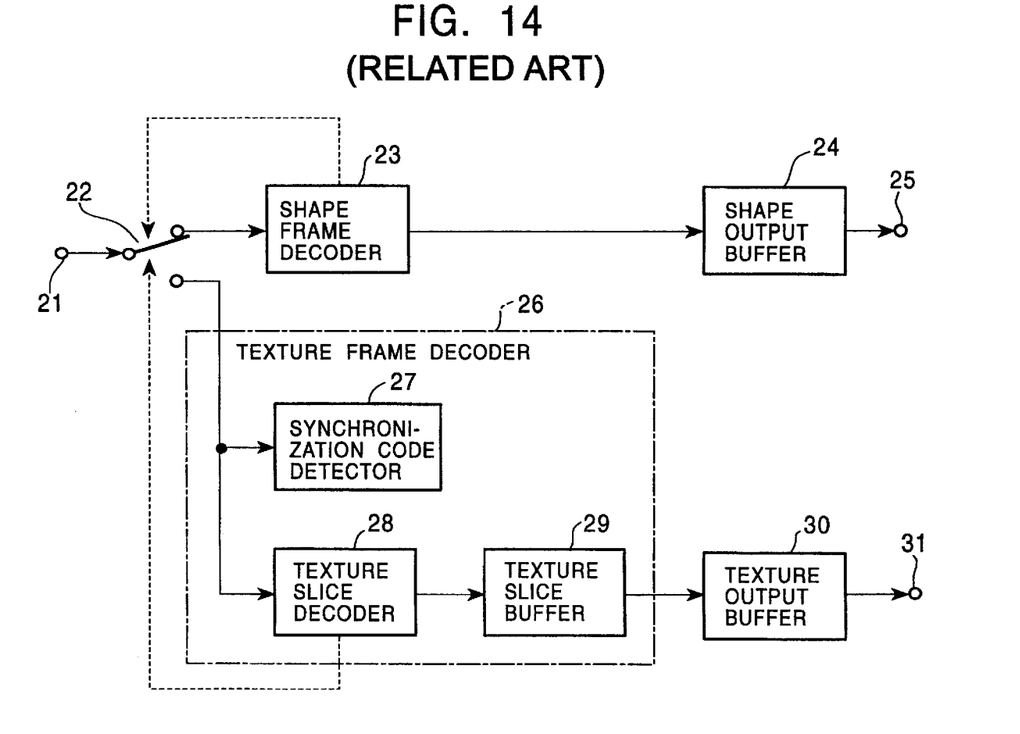
FIG. 14 is a block diagram showing an image decoding apparatus.

The codes generated by the coding apparatus shown in FIG. 13 are decoded by a decoding apparatus shown in FIG. 14. In the decoding apparatus the codes input from a code input terminal 21 are separated in the order of the shape code and the texture code, and the separated codes are sent frame by frame to a shape frame decoder 23 and a texture frame decoder 26, respectively. A switch 22 is controlled such that the switch 22 receives a signal representing the termination of decoding for one frame from the shape frame decoder 23 or a texture slice decoder 28 in the texture frame decoder 26.

The shape frame decoder 23 decodes the input shape code for one frame. The decoded shape for one frame is output from a shape output terminal 25 via a shape output buffer 24.

The texture frame decoder 26 decodes the input texture code for one frame. Decoding by the texture frame decoder 26 is performed by devices shown in a dotted-line frame in FIG. 14. The input to the texture frame decoder 26 is supplied to a synchronization detector 27 and a texture slice decoder 28. The synchronization detector 27 detects a synchronization code when the synchronization code appears in the input code, and sends a reset signal to the texture slice decoder 28. The texture slice decoder 28 decodes the code for one slice input after the reset signal is sent from the synchronization detector 27, and it sends the decoded texture to a texture slice buffer 29. The decoded texture in the texture slice buffer 29 is sent to a texture output buffer 30 and stored therein. The texture for one frame stored in the texture output buffer 30 is output in the order of raster scanning from a texture output terminal 31.

From the texture (not shown) output from the texture output terminal 31, a portion designated by the shape output from the shape output terminal 25 is cut out, and the portion is combined with another image. The composite image is displayed.

The synchronization code included in the code representing the texture includes a location on the decoded image of the successive slice. Thus, even if an errors occur in the texture code, the synchronization code is durable against the error in that the decoding can be performed from the successive slice.

As described above, when an error occurs in the codes, the conventional decoding apparatus enables restoration in the successive slice if the error occurs in the texture code because the synchronization codes are added in units of slices, but cannot enable restoration in the same frame if the error occurs in the shape code. When the shape cannot be decoded, if the texture can be decoded, its image cannot be displayed on the decoded image. Accordingly, an error in the shape hinders the displaying of the frame to its end, which causes a problem in which, although the synchronization code is used, the conventional decoding apparatus is weak in an error in the code portion.

The above coding apparatus codes the shapes for one frame before coding the corresponding texture, which causes a coding delay for one frame. In addition, the shapes for one frame are decoded before the corresponding texture is decoded, which causes a decoding delay for one frame.

Namely, the delays in coding and decoding are disadvantageously long.

SUMMARY OF THE INVENTION

Accordingly, it is an object of the present invention to enhance durability against errors and reduce coding and decoding delays, with coding efficiency maintained. This realizes object-scalable coding having high coding efficiency, strong durability against errors, and reduced delays in coding and decoding.

Accordingly, according to a first aspect of the present invention, the foregoing object is achieved through provision of an image coding apparatus for coding an object image by separating a shape representing the outline of the object and a texture representing the pixel values of the object, the image coding apparatus comprising: a first encoder for generating a shape code by coding the shape in predetermined units; a second encoder for generating a texture code by coding the texture in the predetermined units; a unit for generating a synchronization code with respect to the shape code for each predetermined unit and the texture code for each predetermined unit; and a data arrangement unit for adding the generated synchronization code with respect to the shape code for each predetermined unit and the texture code for each predetermined unit.

According to a second aspect of the present invention, the foregoing object is achieved through provision of an image decoding apparatus for decoding image information coded such that an object image is divided into a shape representing the outline of the object image and a texture representing the pixel values of the object image, the image decoding apparatus comprising: a detector for detecting a synchronization code included in the image information; a first decoder for generating a decoded shape by decoding a shape code coded in predetermined units, included in the image information coded in accordance with a detection signal from the detector; and a second decoder for generating a decoded texture by decoding a texture code coded for each predetermined unit, included in the image information coded in accordance the detection signal from the detector.

According to a third aspect of the present invention, the foregoing object is achieved through provision of an image coding method for coding an object image by separating a shape representing the outline of the object image and a texture representing the pixel values of the object image, the image coding method comprising the steps of: generating a shape code by coding the shape in predetermined units; generating texture code by coding the texture in predetermined units; generating a synchronization code with respect to he shape code for each predetermined unit and the texture for each predetermined unit; and adding the generated synchronization code with respect to the shape code for each predetermined unit and the texture for each predetermined unit.

According to a fourth aspect of the present invention, the foregoing object is achieved through provision of an image coding method for coding an object image by separating a shape representing the outline of the object image and a texture representing the pixel values of the object image, the image coding method comprising the steps of: generating a shape code by coding the shape in predetermined units; generating a texture code by coding the texture in predetermined units; generating a synchronization code with respect to he shape code for each predetermined unit and the texture for each predetermined unit; and adding the generated synchronization code with respect to the shape code for each predetermined unit and the texture for each predetermined unit.

According to a fifth aspect of the present invention, the foregoing object is achieved through provision of an image decoding method for decoding image information coded such that an object image is separated into a shape representing the outline of the object image and a texture representing the pixel values of the object image, the image decoding method comprising the steps of: detecting a synchronization code included in the image information coded; generating a decoded shape by decoding the shape code for each predetermined unit, coded in accordance with a detection signal detected in the detection step; and generating a decoded texture by decoding the texture for each predetermined unit, coded in accordance with the detection signal detected in the detection step.

According to a sixth aspect of the present invention, the foregoing object is achieved through provision of a recording medium in which decoding capable of being performed by a decoding apparatus, including a recorded signal, wherein the recorded signal includes a code signal formed such that an object image is separated into a shape representing the outline of the object image and a texture representing the pixel values of the object image, and they are coded by the steps of: generating a shape code by coding the shape for each predetermined unit; generating a texture code by coding the texture for each predetermined unit; generating a synchronization code with respect to the shape code for each predetermined unit and the texture code for each predetermine unit; and adding the generated synchronization code with respect to the shape code for each predetermine unit and the texture code for each predetermined unit.

According to the image coding apparatus and method, and the image transmission method of the present invention, coding delay can be reduced by using a predetermined unit as the coding unit of a shape and a texture, and codes enabling restoration from an erroneous condition can be output in predetermined units by inserting a synchronization code before a shape code and texture code. In addition, when error durability is not strongly required, coding efficiency can be further increased, with a coding delay maintained.

According to the image decoding apparatus and method of the present invention, a decoding delay can be reduced by using a predetermined unit as the decoding unit of a shape and a texture, and restoration from an erroneous condition can be performed by processing a code succeeding a synchronization code as a shape code or texture code for each predetermined unit. In addition, when error durability is not strongly required, a code having higher coding efficiency can be decoded, with a decoding delay maintained.

According to the image recording medium of the present invention, shape codes coded in predetermined units and texture codes coded in predetermined units are recorded after synchronization codes, which realizes an image recording medium having a reduced decoding delay and high coding efficiency.

DESCRIPTION OF THE PREFERRED EMBODIMENTS

Embodiments of the present invention will be described below. The present invention can be variously modified and applied within the scope thereof. Accordingly, the gist of the present invention is not limited to the embodiments thereof.

Figure 1:
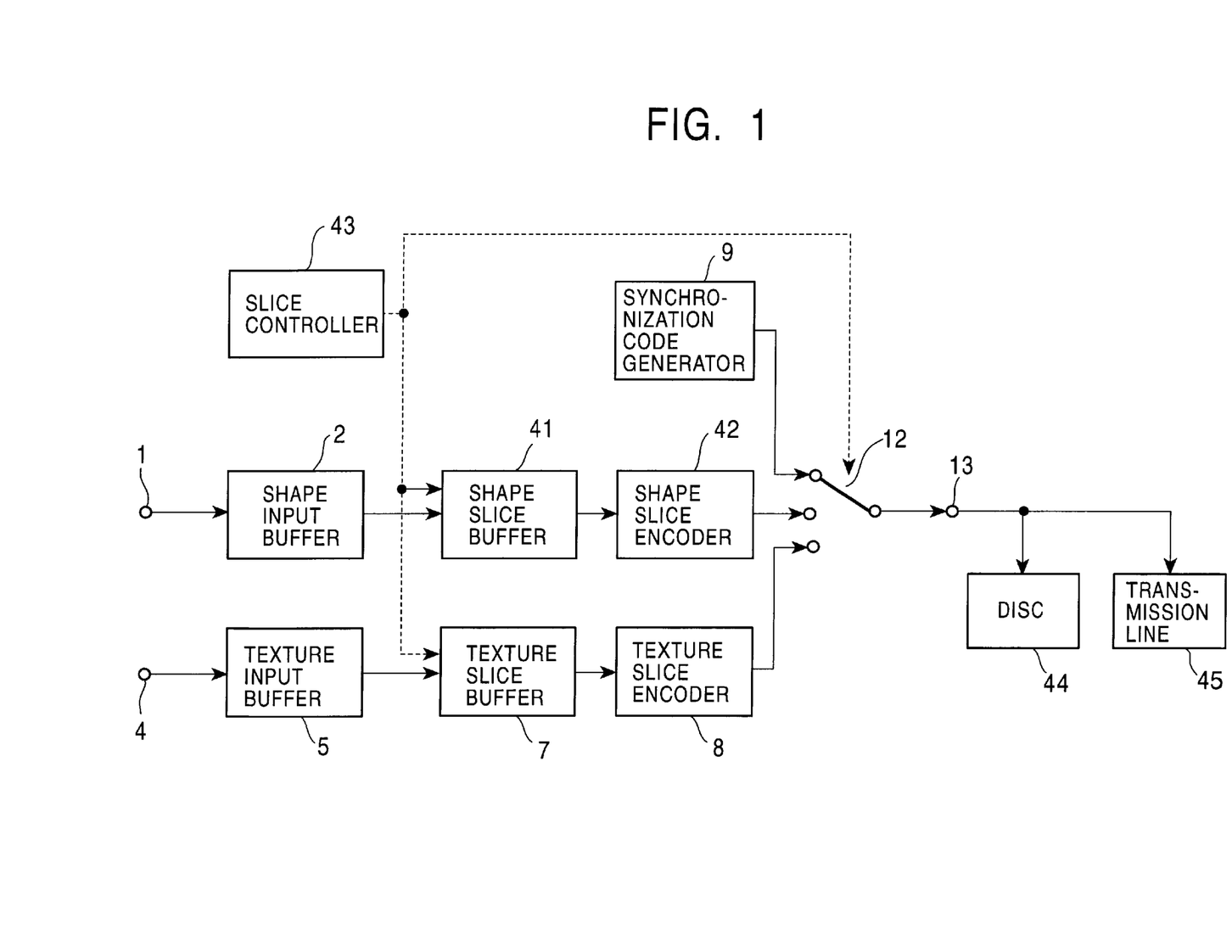
FIG. 1 is a block diagram showing an image coding apparatus according to the present invention.

FIG. 1 shows a block diagram of an image coding apparatus according to an embodiment of the present invention. Portions corresponding to those shown in FIG. 13 are denotes by identical reference numerals, and descriptions thereof will be omitted if necessary.

In the image coding apparatus the output of a shape input buffer 2 is supplied to a shape slice buffer 41 and stored therein. The output of the shape slice buffer 41 is input to a shape slice encoder 42. A slice controller 43 outputs a control signal to the shape slice buffer 41, a texture slice buffer 7 and a switch 12. The switch 12 successively selects one output from the outputs of a synchronization code generator 9, the shape slice encoder 42 and a texture slice encoder 8, and supplies the selected output from a code output terminal 13 to a disc 44 so that it is recorded, or transmits it to a predetermined transmission line 45. Other portions are similar to the case shown in FIG. 13.

A shape input from a shape input terminal 1 is stored in a shape input buffer 2. The shape is a binary or multivalued image. Since in the shape input buffer 2 the data is stored in the order of raster scanning, the data is arranged slice by slice, and the arranged data is sent to the shape slice buffer 41. At this time, information for defining slices is supplied from the slice controller 43 to the shape slice buffer 41. As shown in FIG. 12, the slices are arbitrarily defined to include a case where macroblocks occupying a plurality of rows exist within one slice. The shape slice buffer 42 codes the data for one slice stored in the shape slice buffer 41 by using the interrelation within the slice, and sends the generated code to the switch 12.

A texture input from a texture input terminal 4 is stored in a texture input buffer 5. Since in the texture input buffer 5 the data is stored in the order of raster scanning, the data is arranged slice by slice, and the arranged data is sent to a texture slice buffer 7. At this time, the information for defining slices is sent from the slice controller 43 to the texture slice buffer 7. Accordingly, the shape slice definition and the texture slice definition coincide. The texture slice encoder 8 codes the data for one slice stored in the texture slice buffer 7, and sends the generated code to the switch 12.

The switch 12 sequentially selects the synchronization code generated by the synchronization code generator 9, the shape code for one slice output from the shape slice encoder 42, or the texture code for one slice output from the texture slice encoder 8, and outputs it to the code output terminal 13. Accordingly, the codes output from the code output terminal 13 has the order of the synchronization code, the shape codes for one slice, and the texture code for one slice. The switch 12 is controlled based on the slice definition information obtained from the slice controller 43.

The codes output from the code output terminal 13 are modulated by a modulation circuit (not shown), and is recorded onto the disc 44 or transmitted to the transmission line 45.

According to the image coding apparatus shown in FIG. 1, one synchronization code generated by the synchronization code generator 9 is added to a set of the shape code for one slice and the texture code for one slice.

According to the image coding apparatus shown in FIG. 1, the shape and the texture are processed in units of slices. Thus, a time until data for one slice is input forms a coding delay. As shown in FIG. 11, when one slice occupies no, macroblocks in a different row, the coding delay in this case measures 16 lines. In other words, only coding an image input by raster scanning in units of macroblocks requires a delay for 16 lines. Accordingly, the delay caused by the coding apparatus shown in FIG. 1 is very short.

Figure 3:
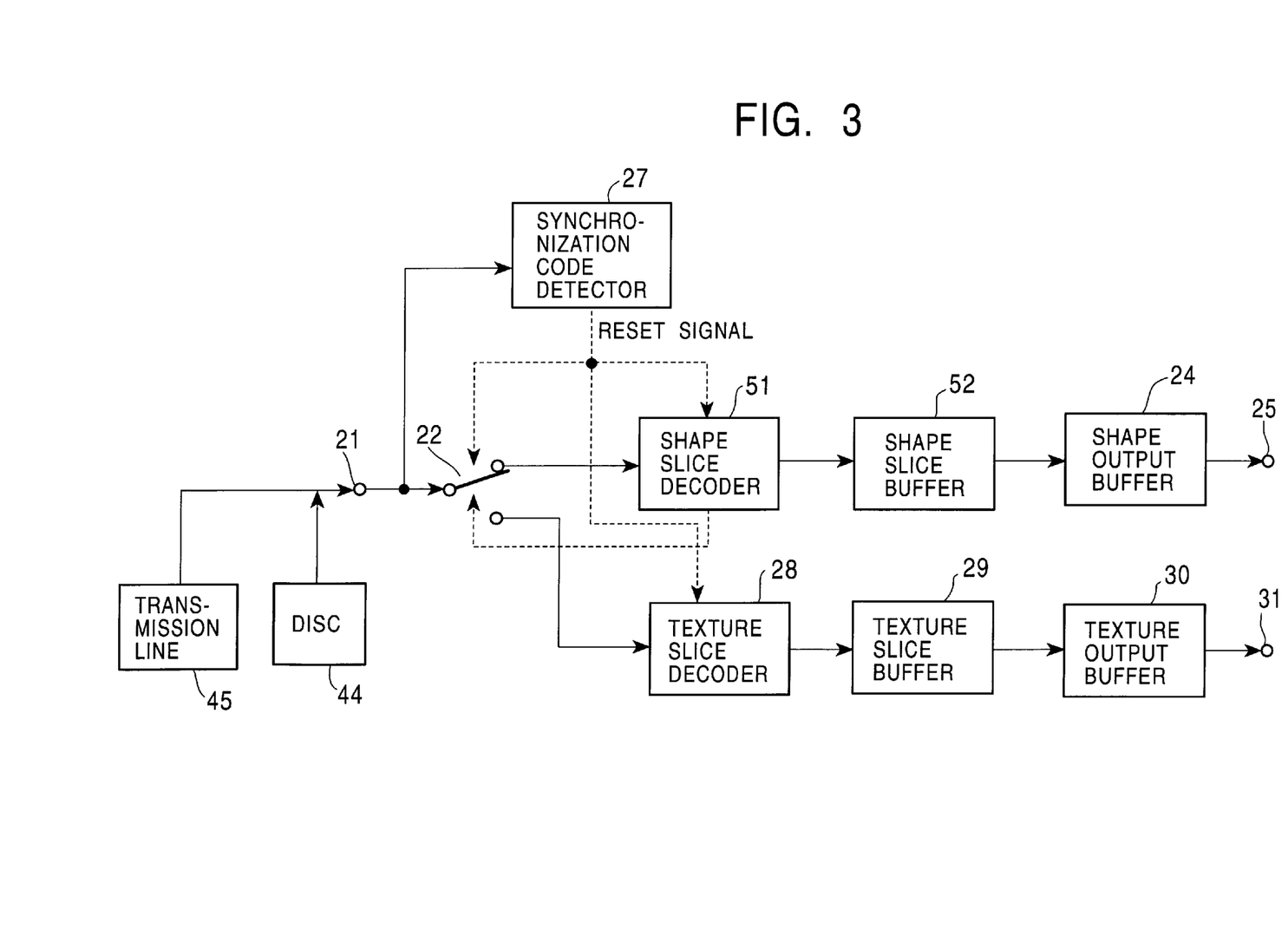
FIG. 3 is a block diagram showing an image decoding apparatus for decoding the output of the image coding apparatus shown in FIG. 1.

FIG. 3 shows a block diagram of a decoding apparatus for decoding the codes formed by the coding apparatus shown in FIG. 1, recorded on the disc 44, or transmitted via the transmission line 45. Portions corresponding to those shown in FIG. 14 are denoted by identical reference numerals, and descriptions thereof will be omitted if necessary.

In the decoding apparatus, codes reproduced from the disc 44 or transmitted via the transmission line 45 are demodulated by a demodulation circuit (not shown), and the demodulated codes are supplied from a code input terminal 21 to a synchronization code detector 27. The codes supplied from the code input terminal 21 are supplied by a switch 22 to a shape slice decoder 51 or a texture slice decoder 28. The synchronization code detector 27 detects a synchronization code from the input codes. When detecting the synchronization code, the synchronization code detector 27 outputs a reset signal to the switch 22, the shape slice decoder 51 and the texture slice decoder 28.

The shape slice decoder 51 decodes a shape supplied from the switch 22, and outputs the decoded shape to a shape slice buffer 52. The output of the shape slice buffer 52 is supplied to a shape output buffer 24. Other portions are similar to the decoding apparatus shown in FIG. 14.

The codes input from the code input terminal 21 are sent to the synchronization code detector 27 and the switch 22. The synchronization code detector 27 detects a synchronization code from the input codes, and sends a reset signal to the shape slice decoder 51 and the texture slice decoder 28. The switch 22 separates the input codes supplied after the reset signal is sent from the synchronization code detector 27, into the shape code and the successive texture code, and sends the shape code to the texture slice decoder 28 or sends the texture code to the texture slice decoder 28.

A signal representing the termination of decoding for one slice by the shape slice decoder 51 is transmitted to the switch 22. The switch 22 recognizes that the transmitted signal is a start of codes to be sent to the texture slice decoder 28. The texture slice decoder 28 decodes the input codes supplied after the reset signal is sent from the synchronization code detector 27, to form a shape for one slice, and it sends the decoded shape to the shape slice buffer 52. The shape stored in the shape slice buffer 52 is, sent to a shape slice buffer 24 and stored therein. The shape slice buffer 24 converts the shape supplied in the order of slicing to the shape arranged in the order of raster scanning before outputting it from a shape output terminal 25.

The texture slice decoder 28 decodes the input code from the switch 22 to form a texture for one slice, and sends the decoded texture to the texture slice buffer 29. The texture stored in the texture slice buffer 29 is sent to a texture output buffer 30 and stored therein. The texture output buffer 30 converts the shape supplied in the order of slicing to the shape arranged in the order of raster scanning, and outputs it from a texture output terminal 31.

Figure 2:
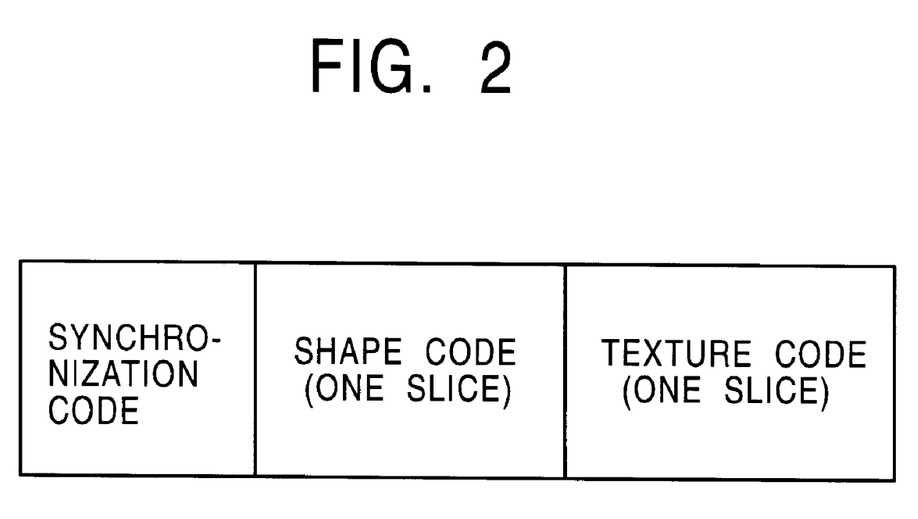
FIG. 2 is a chart illustrating the operation of a switch shown in FIG. 1.

As shown in FIG. 2, the codes output from the coding apparatus shown in FIG. 1 consist of one synchronization code, one shape code for one slice and one texture code for one slice, arranged in the order given, which correspond to each slice. Accordingly, even if an error occurs in the shape code or the texture code, and even if an error occurs in the synchronization code, only the one slice data cannot be decoded but normal decoding can be performed from the successive slice (without an error).

In the above-described manner, coding by the coding apparatus shown in FIG. 1 and decoding by the decoding apparatus shown in FIG. 3 enables strong durability against errors in which, if an error occurs on a code storage medium or a code transmission line, the influence of the error is limited to the slice having the error.

Since shapes and textures are processed in units of slices, a time until data for one slice is stored in the output buffers 24 and 30 is a decoding delay. As shown in FIG. 11, when one slice occupies no macroblocks in a different row, the decoding delay of this case measures 16 lines. In addition, outputting an image decoded in units of macroblocks by raster scanning requires a delay for 16 lines. This, the delay caused by the decoding apparatus shown in FIG. 3 is very short.

Figure 4:
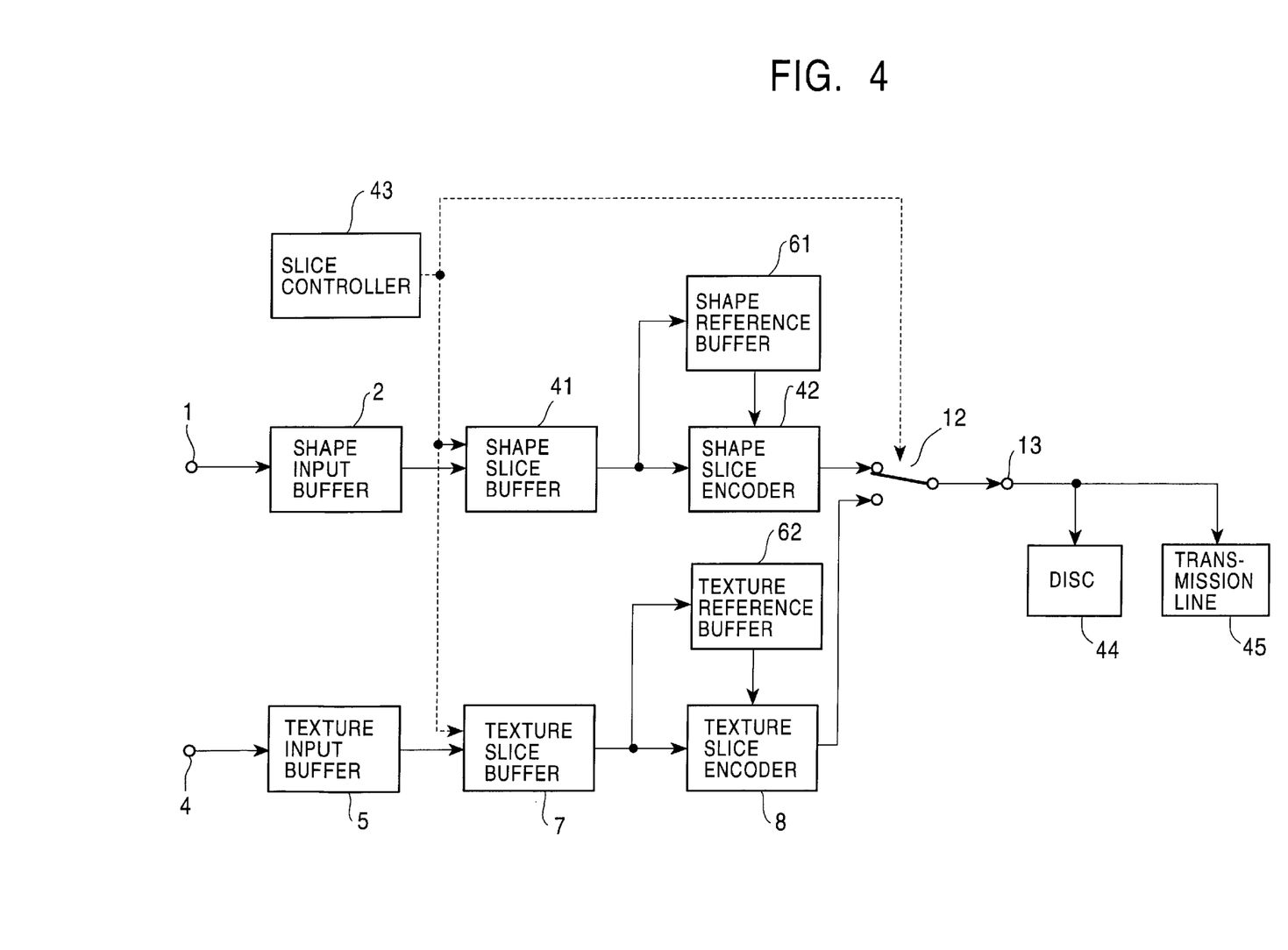
FIG. 4 is another block diagram showing the image coding apparatus according to the present invention.

FIG. 4 shows another block diagram of the coding apparatus of the present invention. From a shape slice buffer 41 a shape is supplied to a shape reference buffer 61 and stored therein, and is supplied to a shape slice encoder 42 and coded therein. A texture from a slice buffer 7 is supplied to a texture reference buffer 62 and stored therein, and is supplied to a texture slice encoder 8 and coded therein. At this time, the shape slice encoder 42 and the texture slice encoder 8 perform encoding, referring to the data stored in the shape reference buffer 61 and the texture reference buffer 62, respectively. A synchronization code generator 9 as shown in FIG. 1 is omitted. Other portions are similar to the case shown in FIG. 1.

Figure 5:
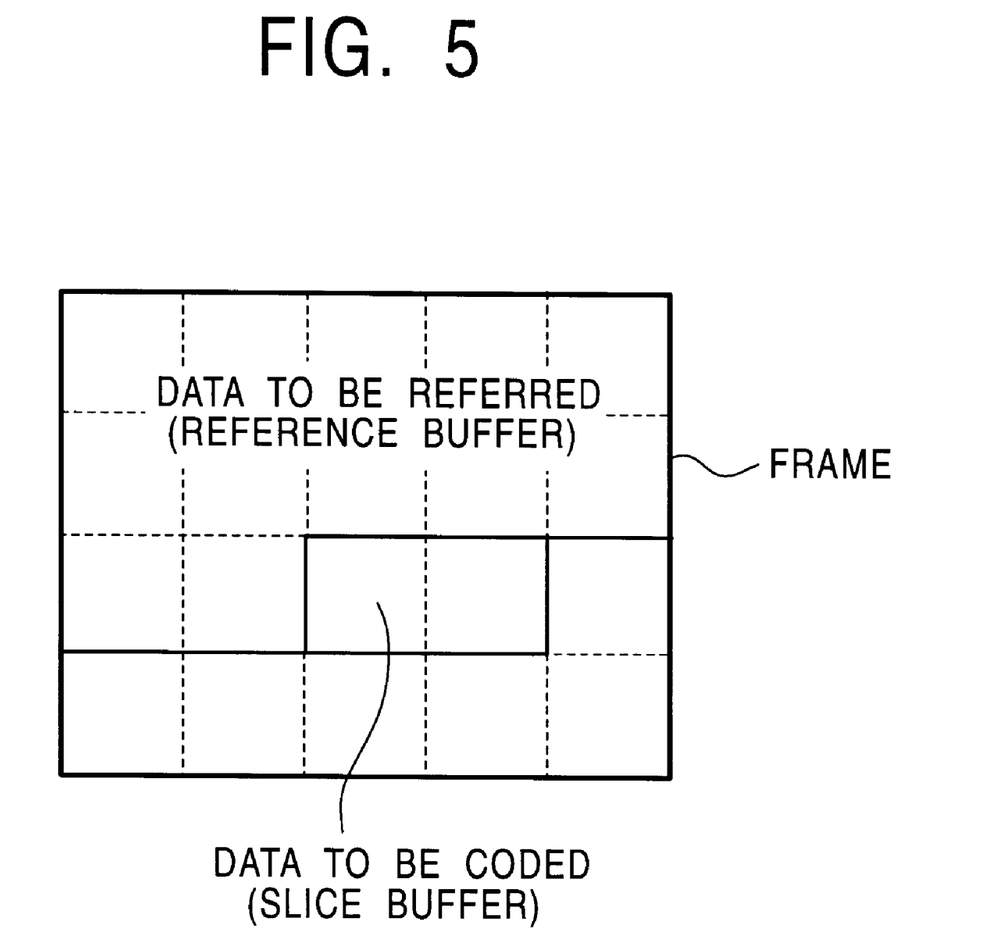
FIG. 5 is a chart illustrating the relationship between data stored in a reference buffer and data stored in a slice buffer.

The pixel value of the shape supplied from the shape slice buffer 41 is stored in the shape reference buffer 61. The shape slice encoder 42 codes the pixel values of the shape supplied in units of slices from the shape slice buffer 41 by referring to a plurality of pixel values in proximity to a shape (stored in the shape reference buffer 61) positioned where coding has already terminated. For example, when the shape of slice 4 is coded, the shape (pixel values of slice 1 to slice 3) stored in the shape reference buffer 61 and the shape (data of slice 4) stored in the shape slice buffer 41 have a relationship as shown in FIG. 5, and the shape (pixel values of slice 1 to slice 3) stored in the shape reference buffer 61 is referred to. In coding the shape of slice 4, the pixel values of the shape of slice 4 positioned where coding has terminated are stored in the shape reference buffer 61, and are used as reference pixels.

The pixel values of the texture supplied from the texture buffer 7 are stored in the texture reference buffer 62. The texture slice encoder 8 codes the texture supplied in units of slices from the texture slice buffer 7 by referring to so macroblocks (stored in the texture reference buffer 62) in proximity to a texture positioned where coding has already terminated. Also, in this case the data relationship as shown in FIG. 5 is established. In coding the texture of slice 4, the macroblocks of the texture of slice 4 positioned where coding has already terminated are stored in the texture reference buffer 62, and are used as reference macroblocks.

The coding apparatus shown in FIG. 4 can performs coding, using the interrelation with the adjacent data, in the shape slice encoder 42 and the texture slice decoder 8, which increases the coding efficiency. In addition, the coding apparatus does not insert a synchronization code for each slice. Thus, compared with the embodiment shown in FIG. 1, the coding apparatus shown in FIG. 4 enables higher coding efficiency.

Needless to say, similar to the coding apparatus shown in FIG. 1, the coding apparatus shown in FIG. 4 may use a synchronization code generator to insert a synchronization code for each frame (in units of objects). In this case, if an error occurs in a certain frame, the influence of the error is limited within only the frame. Accordingly, error durability can be obtained.

Figure 6:
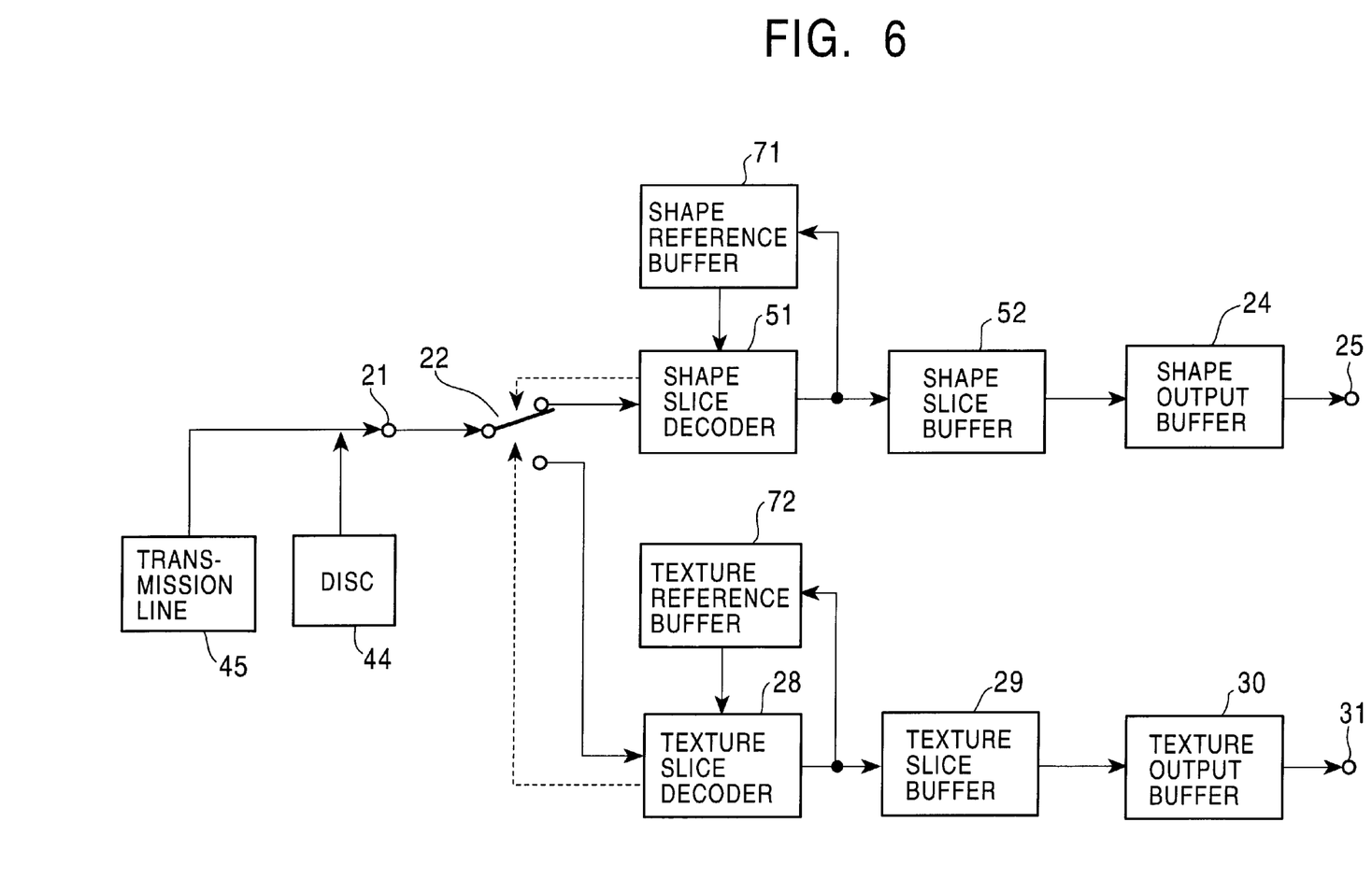
FIG. 6 is a block diagram showing an image decoding apparatus for decoding the output of the image coding apparatus shown in FIG. 4.

FIG. 6 shows a block diagram of a decoding apparatus for decoding the codes formed by the coding apparatus shown in FIG. 4. In this decoding apparatus a synchronization code detector 27 as shown in FIG. 3 is omitted, and a shape reference buffer 71 and a texture reference buffer 72 are provided. A shape decoded by a shape slice decoder 51 is stored in the shape reference buffer 71, and a texture decoded by a texture slice decoder 28 is stored in the texture reference buffer 72. Other portions are identical to those shown in FIG. 3.

The shape reference buffer 71 holds the shape for the decoded slice. The shape slice decoder 51 performs decoding by referring to the pixel values of the shape for the decoded slice, stored in the shape reference buffer 71, and it sends the decoded shape to a shape slice buffer 52 and the shape reference buffer 71. Also, in this case, the data relationship as shown in FIG. 5 is established. When the shape for slice 4 is decoded, the decoded pixel values of the shape for slice 4, positioned where decoding has terminated, are stored in the shape reference buffer 71 and used as reference pixels.

In addition, the texture reference buffer 72 holds the texture for the decoded slice. The texture slice decoder 28 decodes the input texture code by referring to macroblocks forming the decoded slice, stored in units of macroblocks in the texture reference buffer 72, and it sends the decoded texture to a texture slice buffer 29 and the texture reference buffer 72. Also, in this case the data relationship as shown in FIG. 5 is established. When the texture for slice 4 is decoded, macroblocks of the texture for the slice, positioned where decoding has terminated, are stored in the texture reference buffer 72 and used as reference macroblocks.

The shape slice decoder 51 and the texture slice decoder 28 can perform decoding, using the interrelation with the decoded approximate data, which enables the decoding of a code having high coding efficiency. In addition, the synchronization code is not inserted in units of slices. Thus, the decoding apparatus shown in FIG. 6 enables the decoding of a code having high coding efficiency compared with the decoding apparatus shown in FIG. 3.

It need hardly be said that, when the codes with the synchronization code inserted for each frame by the coding apparatus shown in FIG. 4 are decoded, the decoding apparatus shown in FIG. 6 also uses a synchronization code detector to detect a synchronization code frame by frame. On detecting the synchronization code, the decoding apparatus shown in FIG. 6 performs decoding regarding the detected code as a start of the successive frame, whereby error durability in which if an error occurs its influence is limited in the frame can be obtained.

Figure 7:
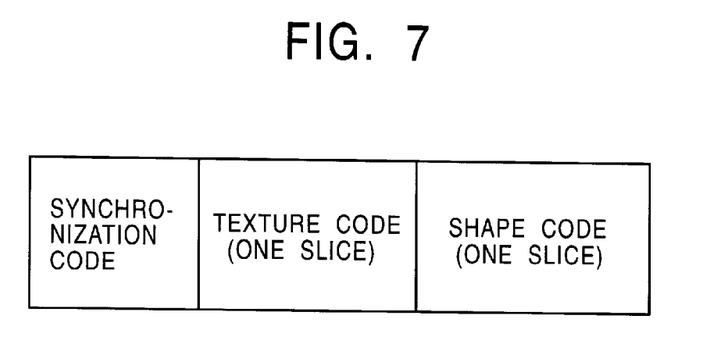
FIG. 7 is a chart illustrating the operation of the switch shorn in FIG. 1.
Figure 8:
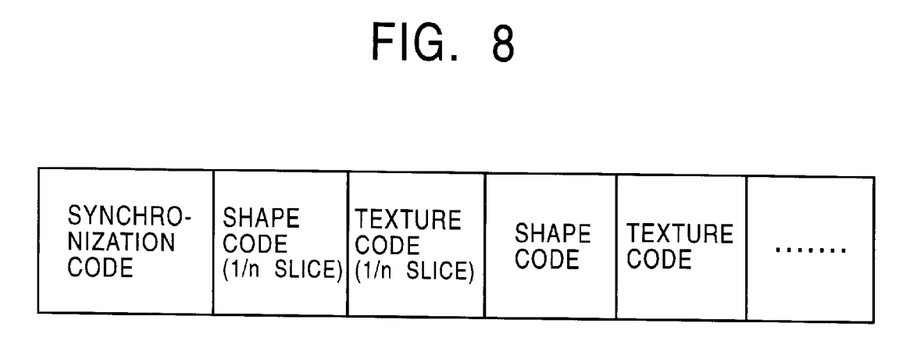
FIG. 8 is a chart illustrating the operation of the switch shown in FIG. 1.

As described above, the coding apparatus firstly sends a shape code, and secondly sends a texture code. However, as shown in FIG. 7, the codes may be sent in the reverse order, and as shown in FIG. 8, 1/n portions of the shape code and 1/n portions of the texture code may be alternately sent. In this case, the decoding apparatus performs decoding in the same order of coding by the coding apparatus.

In the embodiments shown in FIGS. 1 and 4, when the interrelation of frames is used to perform coding, even if no error occurs in the slice, an error in a frame to be referred to for frame prediction hinders normal decoding. Accordingly, creating a frame to be coded without using inter-frame prediction is effective in enhancing error durability. Therefore, when all the macroblocks are intra-coded in texture coding, error durability can be enhanced by performing the intra-coding of all the macroblocks in also shape coding. In this case, if all the macroblocks of a texture haves been intra-coded, the decoding apparatus performs the intra-decoding of all the macroblocks of the shape.

In the other embodiment of the present invention, when a texture is coded in units of macroblocks, adjacent macroblocks are referred to. In the coding, when the DCT and quantization are used to perform coding, the macroblocks obtained after the DCT and quantization may be coded referring to the interrelation.

What is claimed is:

1. An image coding apparatus for coding an object image by separating a shape representing the outline of said object and a texture representing the pixel values of said object, said image coding apparatus comprising:

a first encoder for generating a shape code by coding said shape in slices;

a second encoder for generating a texture code by coding said texture in the same slices;

a unit for generating a synchronization code for each object image;

a data arrangement unit for adding the generated synchronization code with respect to shape codes and texture codes on a frame by frame basis;

a first memory for storing a shape code for pixels of at least one slice of a current frame positioned where shape coding for the at least one slice has already terminated;

a second memory for storing a texture code for pixels of at least one slice of the current frame positioned where texture coding has already terminated;

said first encoder coding a shape associated with a current slice of the current frame by referring to the shape code stored in said first memory;

and said second encoder coding a texture of the current slice by referring to the texture code stored in said second memory.

2. An image coding apparatus according to claim 1, wherein said second encoder codes said texture in units of macroblocks.

3. An image coding apparatus according to claim 1, wherein said shape is a binary or multivalued image.

4. An image decoding apparatus for decoding image information coded such that an object image is divided into a shape representing the outline of said object image and a texture representing the pixel values of said object image, said image decoding apparatus comprising:

a detector for detecting a synchronization code included in said image information;

a first decoder for generating a decoded shape by decoding a shape code coded in slices, included in said coded image information in accordance with a detection signal from said detector;

a second decoder for generating a decoded texture by decoding a texture code coded for each slice, included in said coded image information in accordance with the detection signal from said detector;

a first memory for storing a shape code for pixels of at least one slice of a current frame positioned where decoding of the at least one slice has already terminated;

a second memory for storing a texture code for pixels of at least one slice of the current frame positioned where texture decoding has already terminated;

said first decoder decoding a shape associated with a current slice of the current frame by referring to the shape code stored in said first memory;

and said second decoder decoding a texture of the current slice by referring to the texture code stored in said secondary memory.

5. An image decoding apparatus according to claim 4, wherein said second decoder decodes said texture in units of macroblocks.

6. An image coding method for coding an object image by separating a shape representing the outline of said object and a texture representing the pixel values of said object, said method comprising:

generating a shape code by coding said shape in slices;

generating a texture code by coding said texture in the same slices;

storing a shape code for pixels of at least one slice of a current frame positioned where shape coding for the at least one slice has already terminated;

storing a texture code for pixels of at least one slice of the current frame positioned where texture coding has already terminated;

coding a shape associated with a current slice of the current frame by referring to the stored shape code;

coding a texture of the current slice by referring to the stored texture code;

generating a synchronization code for each object image; and adding the generated synchronization code with respect to shape codes and texture codes on a frame by frame basis.

7. An image decoding method for decoding image information coded such that an object image is divided into a shape representing the outline of said object image and a texture representing the pixel values of said object image, comprising:

generating a decoded shape by decoding a shape code coded in slices, included in said coded image information;

generating a decoded texture by decoding a texture code coded for each slice, included in said coded image information;

storing a shape code for pixels of at least one slice of a current frame positioned where decoding of the at least one slice has already terminated;

storing a texture code for pixels of at least one slice of the current frame positioned where texture decoding has already terminated;

decoding a shape associated with a current slice of the current frame by referring to the stored shape code;

decoding a texture of the current slice by referring to the stored texture code; and detecting a synchronization code included in said image information on a frame by frame basis, and performing said decoding in accordance with said detected synchronization code.

8. An image transmission method for transmitting image information coded such that an object image is separated into a shape representing the outline of said object image and a texture representing the pixel values of said object image, said image transmission method comprising:

generating a shape code by coding said shape in slices;

generating a texture code by coding said texture in the same slices;

storing a shape code for pixels of at least one slice of a current frame positioned where shape coding for the at least one slice has already terminated;

storing a texture code for pixels of at least one slice of the current frame positioned where texture coding has already terminated;

coding a shape associated with a current slice of the current frame by referring to the stored shape code;

coding a texture of the current slice by referring to the stored texture code;

generating a synchronization code for each object image;

adding the generated synchronization code with respect to shape codes and texture codes on a frame by frame basis; and transmitting the generated shape and texture codes as transmission data.

9. A recording medium having stored thereon a recorded signal to be decoded by a decoding apparatus, wherein said recorded signal includes a code formed such that an object image is separated into a shape representing the outline of said object image and a texture representing the pixel values of said object image, and said shape and said texture are coded by the steps of:

generating a shape code by coding said shape in slices;

generating a texture code by coding said texture in the same slices;

storing a shape code for pixels of at least one slice of a current frame positioned where shape coding for the at least one slice has already terminated;

storing a texture code for pixels of at least one slice of the current frame positioned where texture coding has already terminated;

coding a shape associated with a current slice of the current frame by referring to the stored shape code;

coding a texture of the current slice by referring to the stored texture code;

generating a synchronization code for each object image; and adding the generated synchronization code with respect to shape codes and texture codes on a frame by frame basis.

* * * * *